United States Patent
Petrelli

(10) Patent No.: US 10,195,798 B2
(45) Date of Patent: Feb. 5, 2019

(54) PORTABLE COMPRESSOR FOR A TIRE REPAIR KIT

(71) Applicant: TEK Global S.r.l., Pesaro (IT)

(72) Inventor: Guido Petrelli, Pesaro (IT)

(73) Assignee: TEK Global S.r.l., Pesaro (IT)

( * ) Notice: Subject to any disclaimer, the term of this patent is extended or adjusted under 35 U.S.C. 154(b) by 0 days.

(21) Appl. No.: 15/499,744

(22) Filed: Apr. 27, 2017

(65) Prior Publication Data

US 2017/0313001 A1    Nov. 2, 2017

(30) Foreign Application Priority Data

Apr. 28, 2016  (IT) ........................ 102016000043664

(51) Int. Cl.
| | | |
|---|---|---|
| B29C 73/02 | (2006.01) | |
| B29D 30/06 | (2006.01) | |
| B60S 5/04 | (2006.01) | |
| B29C 73/16 | (2006.01) | |
| B29L 30/00 | (2006.01) | |

(52) U.S. Cl.
CPC .......... *B29C 73/025* (2013.01); *B29C 73/166* (2013.01); *B29D 30/0681* (2013.01); *B60S 5/04* (2013.01); *B29L 2030/00* (2013.01)

(58) Field of Classification Search
CPC ....... B29C 73/025; B29C 73/166; B60S 5/04; B60C 29/062
See application file for complete search history.

(56) References Cited

U.S. PATENT DOCUMENTS

| | | | |
|---|---|---|---|
| 9,289,953 B2 * | 3/2016 | Takahara ............... | B29C 73/166 |
| 2016/0136906 A1 * | 5/2016 | Chou .................... | B29C 73/025 |
| | | | 141/38 |

FOREIGN PATENT DOCUMENTS

| | | |
|---|---|---|
| DE | 202015106283 | 1/2016 |
| EP | 1439053 | 7/2004 |
| JP | 2001212883 | 8/2001 |

OTHER PUBLICATIONS

"Italian Application No. ITUA20162982, Search Report and Written Opinion dated Jan. 10, 2017", (Jan. 10, 2017), 7 pgs.

* cited by examiner

*Primary Examiner* — Timothy L Maust
*Assistant Examiner* — Timothy P Kelly
(74) *Attorney, Agent, or Firm* — Schwegman Lundberg & Woessner, P.A.

(57) ABSTRACT

A portable compressor for a tire repair kit comprises an adaptor mobile or removable from a force transmitting use position, the adaptor having an upper edge projecting with respect to an outer side wall of the compressor and defining a seat for a container of sealing fluid, the upper edge being spaced in use from a surface on which the compressor rests; and being configured to define a side support by means of a force transmission to the compressor to oppose an excessive inclination of the container of sealing fluid during the injection of sealing fluid by means of pressurized air.

9 Claims, 5 Drawing Sheets

PORTABLE COMPRESSOR FOR A TIRE REPAIR KIT

PRIORITY CLAIM

This application claims priority from Italian Patent Application No. 102016000043664 filed on Apr. 28, 2016, the disclosure of which is hereby incorporated by reference herein in its entirety.

TECHNICAL FIELD

The present invention relates to an improved portable compressor for a tire repair kit.

BACKGROUND

According to one embodiment, a repair kit comprises a compressor and a container for a sealing fluid injected in the tire by the compressor.

Subsequently, the compressor is coupled to the tire for inflating and restoring the conditions of use. In this way, the vehicle can circulate and, for example, safely reach a workshop for further controls.

The container of sealing fluid and the compressor may be separately found on the market, for instance because identical spares of the container of sealing fluid originally supplied with the compressor are no longer available, e.g. when the expiration date of the sealing fluid has been surpassed. The fluid usually expires after 5 years, and the original containers of sealing fluid may be difficult to find.

Furthermore, if purchased separately from the compressor for which they had been designed, some containers of sealing fluid can be unstable and not keep a position suitable for the injection of sealing fluid.

SUMMARY

The object of the present invention is to provide a universal compressor to be used in combination with containers of sealing fluid having different configurations.

The object of the present invention is achieved by means of a compressor according to claim 1.

BRIEF DESCRIPTION OF THE DRAWINGS

The present invention will now be described with reference to the accompanying drawings showing some non-limiting embodiments, wherein.

DETAILED DESCRIPTION

Figure 1:
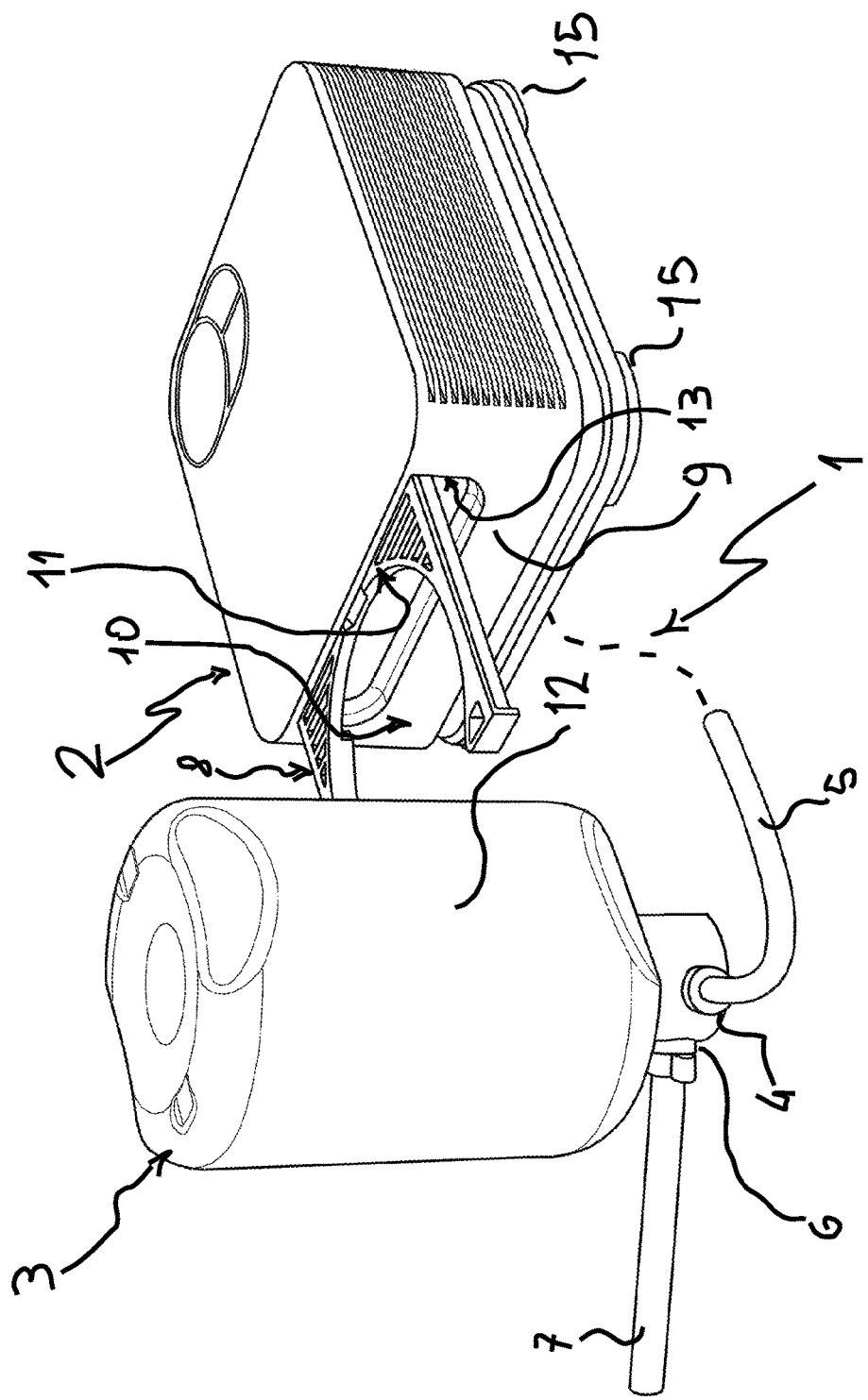
FIGS. 1 and 2 are perspective views of a kit comprising a compressor according to the present invention.

In FIG. 1, the reference number 1 indicates in its whole a kit for repairing and inflating tires comprising a portable compressor 2 and a container of sealing fluid 3. The container 3 comprises an inlet 4, which can be coupled to the compressor through a pipe or duct 5 for sending pressurized air to the container 3, and an outlet 6, which can be coupled to a tire through a pipe or duct 7 for sending sealing fluid and/or pressurized air to the tire (not shown). The container 3 can comprise one or both pipes 5, 7 by means of a suitable fixed fluid connection. Alternatively, the pipes 5 and 7 can be coupled to the container 3 immediately before use, i.e. immediately before the injection of sealing fluid. In any case, the fixed or removable fluid connections between the compressor 2, the container 3, the tire and the pipes 5, 7 are known and not further specified. In the non-limiting example shown in FIG. 1, the pipe 5 is fixedly coupled to the portable compressor 2 and is removably coupled to the inlet 4, and the pipe 7 is fixedly coupled to the outlet 6 to be replaced after using the container 3.

The portable compressor 2 comprises an adaptor 8, projecting with respect to an outer side wall 9 of the compressor 2 for laterally supporting the container 3 and for opposing any excessive inclinations of the container in use. The adaptor 8 defines a seat 10 by means of an edge 11 and the container 3 is housed in the seat 10 at least during the injection of sealing fluid, so that the edge 11 faces a side surface 12 of the container 3 when this latter is housed in the seat 10.

According to the embodiment of FIG. 1, the adaptor 8 is slidingly removable to be hidden inside the compressor 2 in its retracted position (not shown). To be extracted by hand and brought in the extracted position shown in FIG. 1, the outer side wall 9 defines a recess 13 inside which the adaptor 8 projects even in the retracted position so as to be manually extracted by means of one or two fingers.

Figure 2:
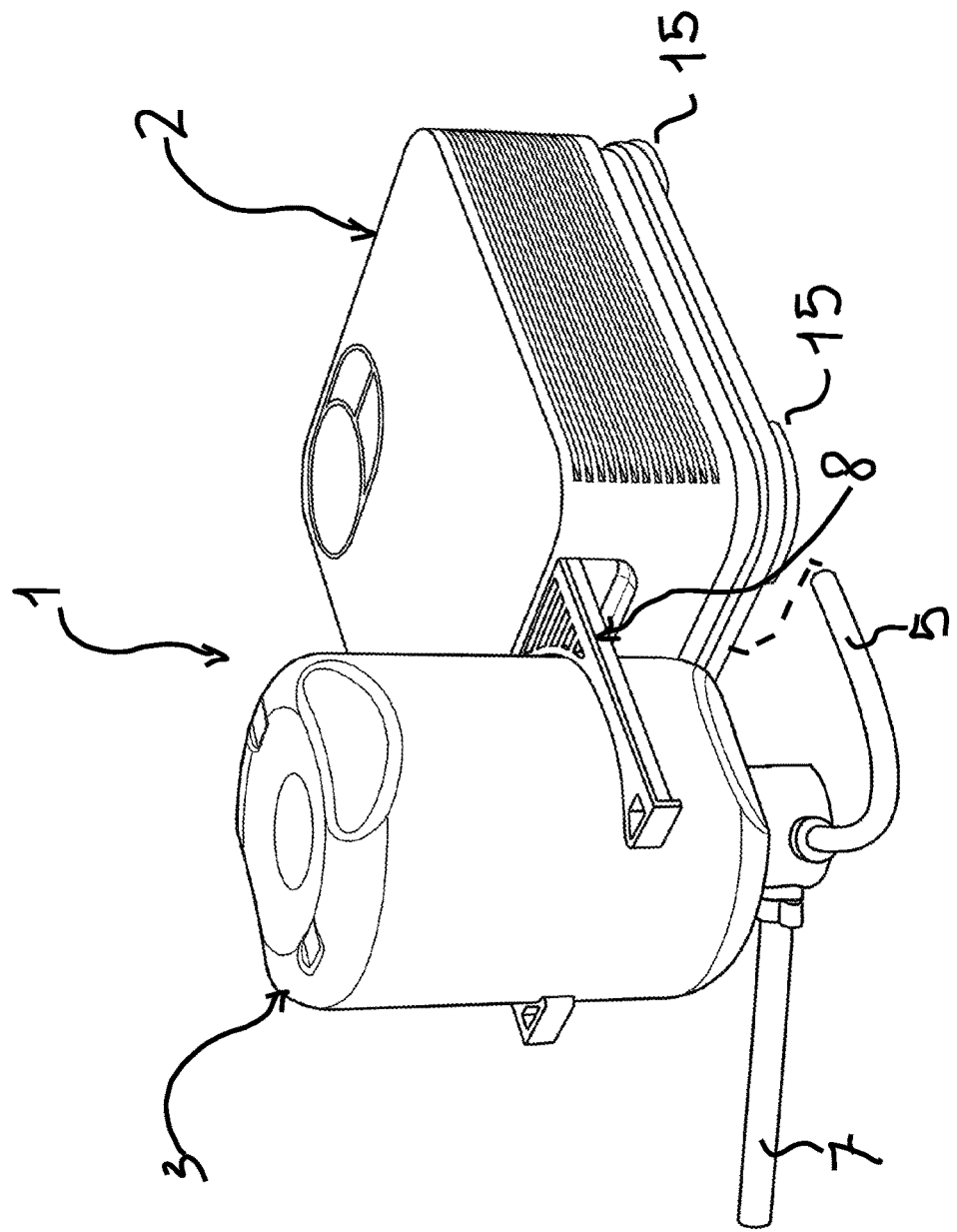

FIG. 2 shows the kit in use, namely ready for the injection of sealing fluid. In the embodiment of FIGS. 1 and 2, the container 3 rests on the ground or on another surface on which the compressor 2 lies, and the adaptor 8 defines an exclusively lateral support for the container 3. The weight of the container 3 is therefore applied on the ground. This support allows keeping the container 3 in the use position, i.e. the vertical one in the example, even during the injection of sealing fluid. In particular, the adaptor 8 is so rigid that it transmits the action of the container 3 to the compressor 2, which, with its own mass, opposes the inclination of the container 3 in use. The adaptor 8 of FIGS. 1 and 2 is a rigid body and, in the extracted position, rigidly transmits any loads applied by the side wall 12 of the container 3. The adaptor 8 or the connection with the compressor 2 may be elastic. In any case, the adaptor 8 transfers the load applied by the side surface 12 to the compressor 2. This latter, through its mass and/or through the position of the mass centre and/or of the supports 15 of the compressor on the ground or on any other surface, provides a sufficient contrasting action to keep the container 3 in a suitable use position.

Figure 3:
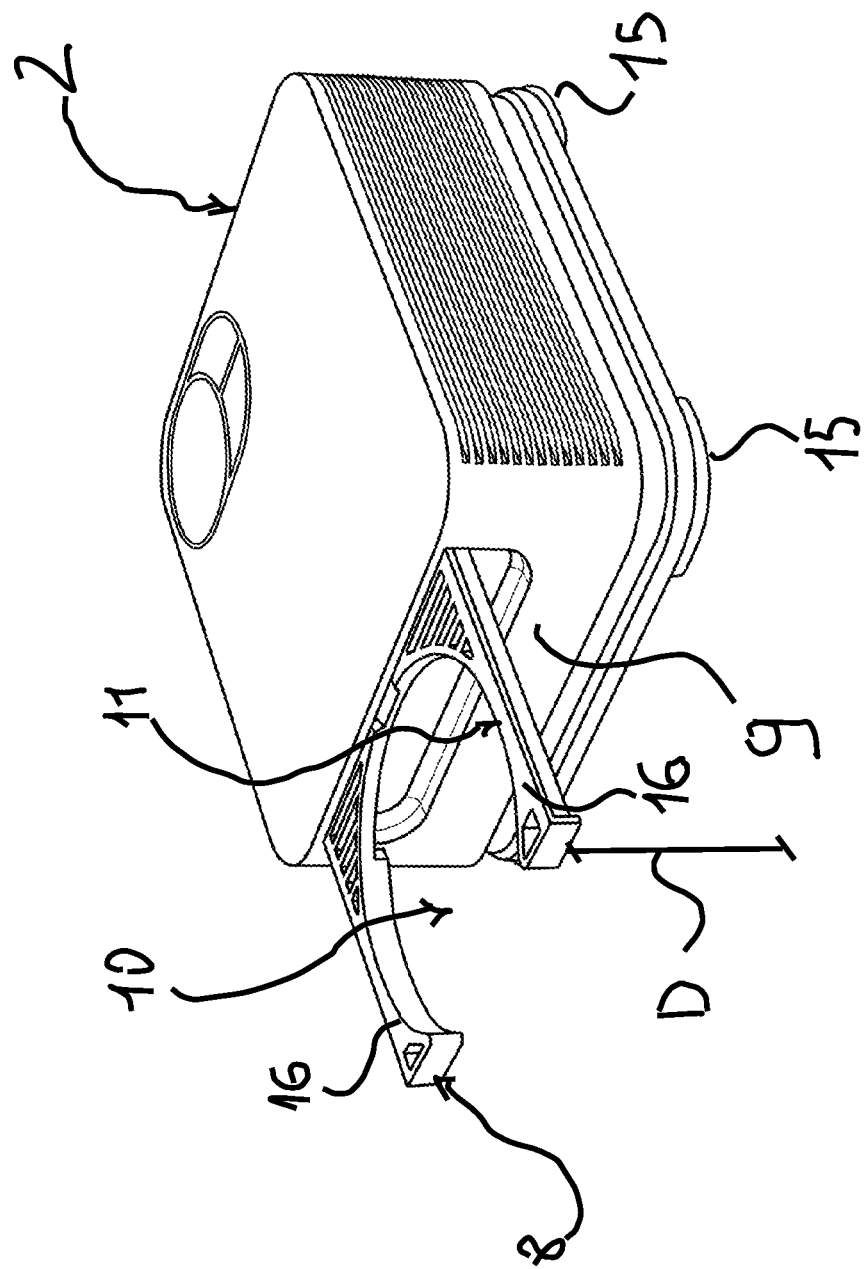
FIG. 3 is a perspective view of the compressor of FIGS. 1 and 2.

FIG. 3 shows the adaptor 8 in the use position, where the edge 11 is spaced by the distance D from the supporting surface of the compressor 2 and the seat 10 is defined. The edge 11 of the adaptor 8 is preferably interrupted and/or open along a periphery of the seat 10. The edge 11 then follows a C-shaped path, possibly defined by a broken line path and/or by circumference arcs having variable bending radii. The C-shape of the edge 11 facilitates the insertion of the container 3 in the seat 10 and prevents any interference with the pipe 7.

In particular, the adaptor 8 comprises a pair of arms 16, preferably opposite with respect to the seat 10. The arms 16 are substantially rigid so that the adaptor 8 is a substantially rigid single body and is, for example, made of a polymeric material. Alternatively, the arms 16 may be elastically deformable to apply a load on the side wall 12 when the container 3 is housed in the seat 10, thus closing any possible play.

Figure 4:
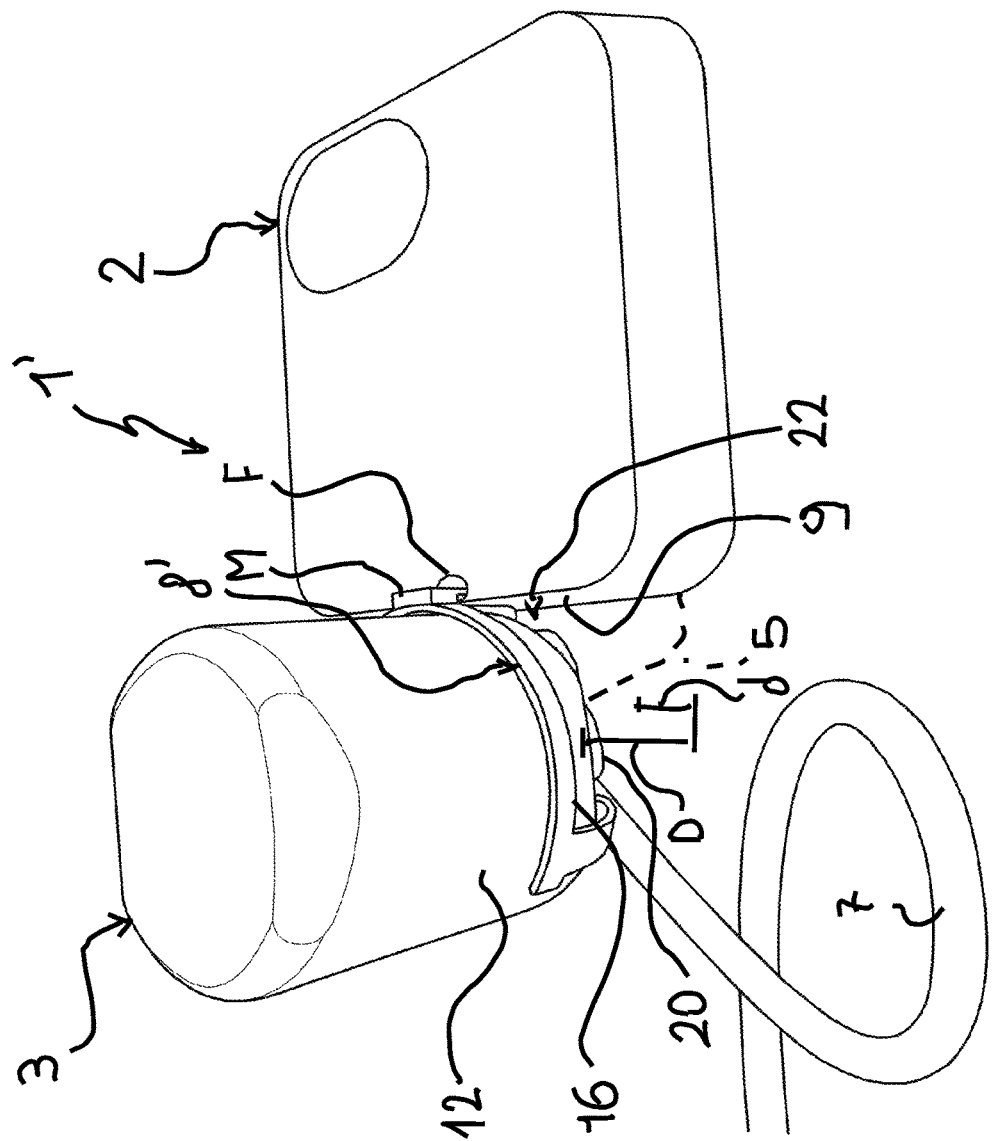
FIG. 4 is a schematic perspective view of a further embodiment of a kit comprising a compressor according to the present invention.

FIG. 4 shows a kit 1' identical to the kit 1, with the exception of what indicated in the following paragraphs. For consistency's sake, the same reference numbers already used in the preceding paragraphs indicate hereinafter the elements of the kit 1' functionally identical to the ones of the kit 1. Furthermore, unless explicitly indicated, what stated hereinafter also applies to the embodiment of FIGS. 1-3.

Figure 5:
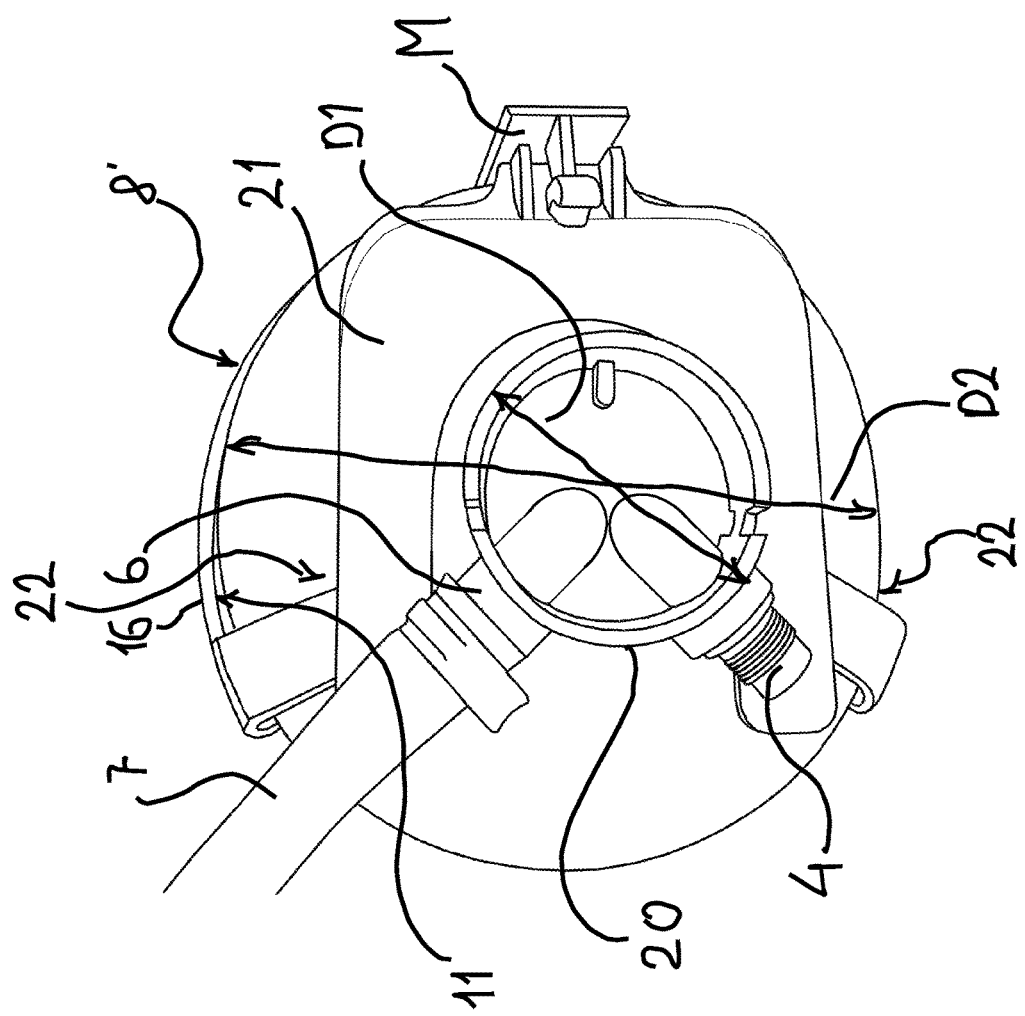
FIG. 5 is a bottom view of a container designed to be coupled to the compressor of FIG. 4.

According to the embodiment of FIG. 4, the compressor 2 comprises an adaptor 8' removable when the compressor 2 is used for the inflation only, and not for the injection of sealing fluid. The adaptor 8 is therefore mechanically coupled to the outer side wall 9. More generally, the adaptor 8' may be removably coupled to an outer shell or casing of the compressor 2, in particular the shell or casing caught by the user to lift and arrange the compressor 2 in the use position or in the stowage position. The shell or casing further houses an electric motor, a piston driven by the electric motor and a compressor body housing the piston and having an outlet coupled to the pipe 5. For example, the form coupling between the adaptor 8' and the outer side wall 9 comprises a male element M that can be inserted in a female element F. In the embodiment of FIGS. 4 and 5, the male element M is supported by the adaptor 8 and the female element F is defined by the outer side wall 9.

Preferably, the adaptor 8 is further configured to keep a lower end portion 20 of the container 3 hovering above the ground at a distance 'd' smaller than the distance 'D' of the upper edge 11. Preferably, the lower end portion 20 comprises one of the inlet 4 and the outlet 5 or both, as shown in FIG. 5.

For this purpose, beside the arms 16, which are arranged in a C-shape around the side wall 12, the adaptor 8' comprises an abutment 21, which in use is arranged below the edge 11 and supports the weight of the container 3. Preferably, the abutment 21 is coupled to the arms 16 and/or to the male element M. According to the embodiment of FIGS. 4 and 5, the adaptor 8' defines side and lower windows 22 between the arms 16 and the abutment 21. The windows 22 are opposite with respect to the seat 10.

The abutment 21 is open at the bottom to house and/or be vertically crossed by the end portion 20 to improve the stabilizing action of the adaptor 8'. In this way, the end portion 20 is suspended in use and the abutment 21 contacts a portion of the container arranged above the end portion 20 when the container 3 is in a use position. This portion has a cross section whose maximum dimension is larger than the one of the end portion 20. In particular, this latter must not consider the pipe(s) possibly fixedly coupled to the container. According to the example in FIGS. 4 and 5, the end portion 20 is cylindrical, with a diameter D1 smaller than the diameter D2 of the side wall 12. Furthermore, the cross section is defined by a horizontal plane, since the compressor 2 rests on another horizontal plane and the use position of the container is such that the axis of the side wall 12 is vertical.

Preferably, also the abutment 21 is open in a lateral direction on the same side of the edge 11, so that the container 3 can be arranged in the seat 10 by the user both with a substantially vertical movement downward and with a lateral approaching movement toward the outer side wall 9.

According to the embodiment of FIGS. 4 and 5, the container 3 hovers above the ground and this is possible because the mass of the compressor is larger than the one of the container 3. Moreover, this is enhanced by the fact that at least one between the electric motor and/or the piston and/or the compressor body is as spaced apart as possible from the form coupling M, F. Preferably, at least the compressor body is adjacent to an outer side wall of the compressor 2 opposite the outer side wall 9 of the form coupling M, F.

Preferably, in order to obtain a sufficient hindrance to an excessive inclination during the injection of sealing fluid, the minimum distance between the ground support of the end portion 20 and the edge 11 or between the abutment 21 and the edge 11 is equal to or greater than 3 cm.

Finally, it is clear that the portable compressor 2 here described and shown can be subject to modifications and variations without departing from the scope of the present invention as defined in the appended claims.

For instance, the edge 11 of the adaptor 8 can be closed along its periphery. In this case, the user places on the ground the container 3 provided with the pipe 7 and then raises or tilts the portable compressor 2 so that the container enters the seat 10 upward.

Alternatively, the edge 11 can be closed and comprise, for instance, a belt with a releasable and possibly adjustable closure, which can be adjusted, in the closed position, to different shapes or transverse dimensions of the container 3.

The portable compressor 2 can be provided with adjusting inserts to allow the pressurized air-tight fluid connection with the inlet 4 of the container 3.

The sliding guide of the adaptor 8 can be replaced by a swinging connection to obtain a configuration similar to the one of FIG. 3 in the open position and a closed position due to the overturning of the adaptor.

It is possible that the edge 11 is two-dimensional as shown in the figures, or that it follows a three-dimensional path. In this latter case, the minimum distance from a supporting surface on which the weight of the container 3 is applied must be of at least 3 cm.

The invention claimed is:

1. A portable compressor for a tire repair kit comprising an adaptor, mobile or removable from a force transmitting use position, the adaptor having an upper edge projecting with respect to an outer side wall of the compressor and defining a seat for a container of sealing fluid, the upper edge being spaced in use from a surface on which the compressor rests; and the adaptor configured to define a side support for force transmission to the compressor to oppose an excessive inclination of the container of sealing fluid during injection of sealing fluid by means of pressurized air, wherein the adaptor has an abutment arranged below said upper edge and adapted to suspend the container.

2. The compressor according to claim 1, wherein the upper edge is open or openable in a peripheral direction.

3. The compressor according to claim 1, wherein the adaptor comprises at least a first and a second arm, each of which defines a respective section of the upper edge to enable the container to enter the seat using an approaching movement toward the outer side wall.

4. The compressor according to claim 1, wherein the adaptor is concealed when in a retracted position.

5. The compressor according to claim 1, wherein the adaptor can be extracted or pivoted.

6. The compressor according to claim 1, wherein the adaptor is open downward so that the container rests in use on the ground when housed in the seat and in that the upper edge limits the side movements of the container.

7. The compressor according to claim 1, wherein the abutment is open downward and is crossed by an end portion of the container.

8. The compressor according to claim 1, wherein the upper edge hovers at least 3 centimeters above a supporting surface on which the weight of the container is applied.

9. A method for tire repair using a compressor according to claim 1, the method comprising bringing to or mounting the adaptor in the use position; and housing a container of sealing fluid in the seat.

* * * * *